Feb. 28, 1950     E. H. LICHTENBERG     2,499,148

TOWING MEANS FOR TWO WHEELED VEHICLES

Filed June 11, 1947

INVENTOR.
E. H. Lichtenberg
BY Robb & Robb
Attorneys.

Patented Feb. 28, 1950

2,499,148

UNITED STATES PATENT OFFICE 2,499,148

TOWING MEANS FOR TWO-WHEELED VEHICLES

Erich H. Lichtenberg, Milwaukee, Wis., assignor to Koehring Company, Milwaukee, Wis., a corporation Application June 11, 1947, Serial No. 753,925

2 Claims. (Cl. 259—176)

My present invention comprises a novel and improved towing connection for two-wheeled vehicles of a type having auxiliary supporting legs adapted to engage the ground or other supporting surface for assisting in the stationary supporting of the said vehicle when disconnected from a towing vehicle. In the type of vehicle to which my invention appertains the body structure of the vehicle is designed to be swung around the axis of the supporting wheels for raising the supporting legs clear of the ground or the supporting surface when the said vehicle is to be connected in towing relation with a towing vehicle.

My invention is especially designed for use in conjunction with a small portable type of concrete mixer mounted for travel movement upon two supporting wheels and having the auxiliary legs aforementioned for engaging the ground to support the mixer in upright position when disconnected from its towing vehicle.

For a better understanding of the nature of my invention it may be well to mention that in this type of small portable two-wheel concrete mixer having the auxiliary supporting legs aforementioned, it has been common in the past to provide a towing connection in the form of a tow pole mounted upon the portable mixer in such a manner as to be used as a lever for swinging the body of the mixer around the axis of its wheels to lift the auxiliary legs clear of the ground by means of a lifting upward movement applied by the workman or operator to the tow pole as a lever for disposing the mixer in position for towing attachment to the pulling vehicle for moving the mixer to a different location.

In previous vehicles having the type of towing connection just mentioned, the same lifting movement applied by the workman to the tow pole as a lever was required in order to swing the mixer around the axis of the wheels to bring the auxiliary leg free of the ground for purposes of manual movement of the mixer by the workman to another location. This lifting movement necessary to be applied by the workman to the tow pole in either case in the use of previous vehicles of this type required a considerable amount of physical exertion and this lifting movement had to be applied by the workman from a stooped or bent-over position of his body which added to the difficulty of this operation.

It is the principle object of my present invention to provide a towing connection for effecting the operations aforesaid in conjunction with the type of vehicle mentioned and so mounted to the vehicle in a novel manner, as to enable the operator to manipulate the towing connection from an upright standing position and by the exertion of a downward pushing force applied to the towing connection assisted by the weight of the operator's body, rather than upward lifting force from an uncomfortable stooped over position as necessary to be applied in previous constructions of this type.

Other objects, advantages and features of the invention will become apparent from the following detailed description of the invention taken in conjunction with the accompanying drawings in which.

Figure 1:
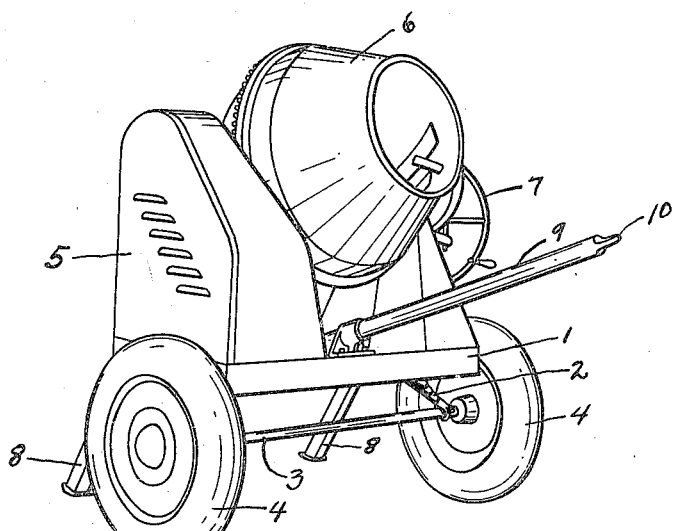
Figure 1 is a perspective view of a small portable two-wheeled concrete mixer in stationary position with the auxiliary legs resting upon the ground or other supporting surface, and illustrating the towing connection of my invention as applied thereto.

Now referring to the drawings, the portable concrete mixer there illustrated comprises a chassis or frame generally designated by the numeral 1 mounted upon suitable springs 2 carried by the cross axle 3 having at either end the ground engaging wheel 4 which form the primary support for the mixer vehicle. Upon the chassis 1 is mounted a suitable engine 5 and suitable supporting structure upon the chassis 1 is also provided for tilting mounting of the mixing drum 6 which is adapted to be rotatably driven for the mixing operation by means of the engine 5. A suitable hand wheel 7 is provided for manual tilting of the mixer drum 6 for charging and discharging operations.

Auxiliary supporting legs 8 are suitably associated with the chassis 1 and the lower ends of these legs 8 are adapted to engage the ground or the supporting surface when the mixer vehicle is disposed, as shown in the drawings, in stationary position disconnected from the pulling vehicle. In carrying out the purposes of my invention, I provide these auxiliary legs 8 attached to the chassis 1 rearwardly of the supporting wheels 4 and extending downwardly rearwardly of the vehicle.

The towing connection, in accordance with my invention, comprises a tow pole 9, the ring end 10 of which extends forwardly of the mixer vehicle, so that the ring end 10 of the tow pole which is used to connect with the pulling vehicle extends to a point in front of the wheels 4 of the mixer vehicle. The tow pole 9 is mounted in association with the chassis frame 1 so that when the mixer vehicle is positioned as indicated in the drawing with the legs 8 engaging the ground or supporting surface, said tow pole 9 extends upwardly and forwardly of the mixer vehicle. To the foregoing end the tow pole 9 is connected to the chassis frame 1 by means of sleeve brackets 11 and 12 bolted to the frame 1, the sleeve portions of which co-axially aligned so that the tow pole 9 may extend therethrough and have detachable connection therewith. For the purposes of the detachable connection of the tow pole 9, a pin 13 is utilized and for the purposes of connection is inserted through suitable apertures in the sleeve portion of the rear sleeve bracket and through the rear portion of the tow pole 9, as seen best in Figures 2 and 3. As will be noted upon reference to Figure 2, the sleeve portion of the front sleeve bracket 11 is positioned at a higher point on the chassis frame 1 than is the sleeve portion of the rear sleeve bracket 12, having reference to the disposition of the mixer vehicle as when the same is in its stationary position indicated in Figures 1 and 2 with the auxiliary legs 8 resting upon the ground or other supporting surface.

Figure 2:
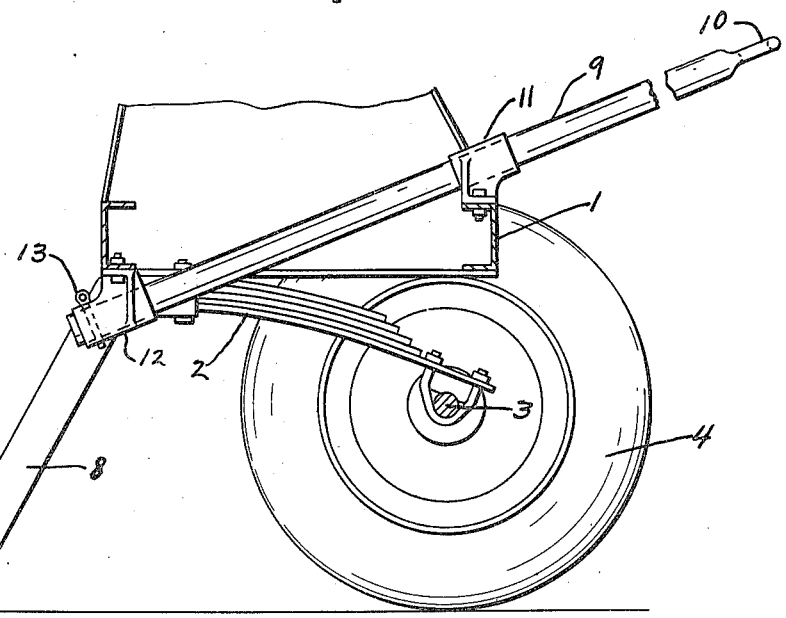
Figure 2 is a vertical sectional view taken through the vehicle illustrated in Figure 1, illustrating more in detail the manner of mounting of the towing connection.
Figure 3:
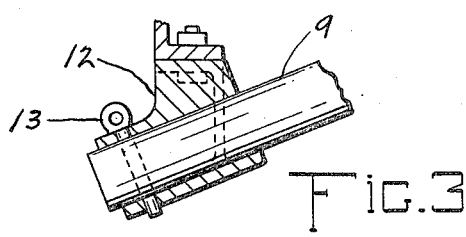
Figure 3 is a detailed sectional view of the detachable mounting of the rear end of the tow pole.

Now with the foregoing construction in mind, it will be seen that with the mixer vehicle in its stationary position of Figures 1 and 2 with the legs 8 resting upon the supporting surface, the tow pole 9 extends upwardly and forwardly in front of the vehicle preferably so that the ring end 10 of the tow pole is positioned at average chest height of a workman who will manipulate the vehicle. Under such condition, it will be apparent that the operator, when he desires to dispose the mixer vehicle for travel movement, may simply place his hand adjacent the forward end of the tow pole 9 and that pushing downwardly thereon with his hand and possibly also his chest, he will thereby cause the vehicle to swing around the axis 3 of the ground engaging wheels 4 so as to bring the auxiliary legs 8 clear of the ground or other supporting surface. When the mixer vehicle has been so manipulated by means of the tow pole 9, in the manner just described, it will be apparent that the operator 10 by maintaining the tow pole in the proper position may push the vehicle to a desired nearby location, or alternatively may secure the ring end 10 of the tow pole in attachment with a pulling vehicle for travel movement to a new more remote location.

Preferably the weight of the vehicle supported by the wheels when the legs 8 are clear of the ground or other supporting surface is so distributed fore and aft of the vehicle that the same will be substantially in balance when the tow pole has been pushed downwardly to a position about at comfortable arm's length at which time the tow pole 9 will be disposed substantially in horizontal position. Under the latter condition it will be easy for the operator to pull or push the mixer vehicle to the desired position either for connecting the tow pole to a pulling vehicle or for moving to another location nearby for further mixing operation.

Having thus described my invention, what I claim as new and desire to secure by Letters Patent of the United States, is:

1. A two wheel concrete mixing machine of the tow-pole type comprising, in combination, a vehicle frame, an axle connected to the frame, two wheels located at opposite sides of the frame and carried by the ends of said axle for supporting the machine for manual propulsion and when towed by another vehicle, legs rigid with the frame at one end and extending down from the frame to engage the ground when the vehicle is at rest, a concrete mixer and engine unit mounted on the frame in positions such that the weight of the mixer and engine biasses the frame in the direction of the legs and stabilizes the same in a position resting on both the wheels and legs while the vehicle is stationary, a tow-pole on the frame extending from the end of the frame opposite that having the legs and extending transversely to the axle in a vertical plane midway of the planes of the wheels, and attaching means on the frame holding the tow-pole securely thereto in a position in which the tow-pole inclines upwardly and outwardly from the frame in a direction opposite from the legs so that the tow-pole may be downwardly depressed to an approximately horizontal towing position to swing the vehicle about the wheel axis to raise the legs from the ground and distribute the weight of the vehicle in substantial balance fore and aft of the axle during travel of the vehicle.

2. A two wheel concrete mixing machine of the tow-pole type comprising, in combination, a vehicle frame, an axle connected to the frame, two wheels located at opposite sides of the frame and carried by the ends of said axle for supporting the machine for manual propulsion and when towed by another vehicle, legs rigid with the frame at the rear end and extending at a rearward inclination down from the frame to engage the ground when the vehicle is at rest, a concrete mixer and engine unit mounted on the frame in positions such that the weight of the mixer and engine biasses the frame in the direction of the legs and stabilizes the same in a position resting on both the wheels and legs while the vehicle is stationary, a tow-pole on the frame extending from the front end of the frame opposite that having the legs and extending forwardly from the front end of the frame and transversely to the axle in a vertical plane midway of the planes of the wheels, a tow connection at the forward outer end of the tow-pole, and attaching means on the frame holding the tow-pole securely thereto in a position in which the tow-pole inclines upwardly and forwardly from the frame in a direction opposite from the rearward inclination of the legs so that the tow-pole may be downwardly depressed to an approximately horizontal towing position to swing the vehicle about the wheel axis to raise the legs from the ground and distribute the weight of the vehicle in substantial balance fore and aft of the axle during travel of the vehicle, said attaching means including coaxially aligned sleeve members, one adjacent the rear end of the frame and one adjacent the forward end of the frame, for receiving said tow-pole.

ERICH H. LICHTENBERG.

REFERENCES CITED

The following references are of record in the file of this patent:

UNITED STATES PATENTS

| Number | Name | Date |
|---|---|---|
| 1,181,569 | Chein | May 2, 1916 |
| 1,790,711 | Johnston | Feb. 3, 1931 |
| 2,277,900 | Ball | Mar. 31, 1942 |
| 2,453,583 | Muller | Nov. 9, 1948 |

FOREIGN PATENTS

| Number | Country | Date |
|---|---|---|
| 1,198 | Australia | Mar. 16, 1931 |